(12) United States Patent
Chinzei et al.

(10) Patent No.: US 11,504,704 B2
(45) Date of Patent: Nov. 22, 2022

(54) EXHAUST GAS PURIFICATION DEVICE

(71) Applicants: Isao Chinzei, Toyota (JP); Takumi Tojo, Toyota (JP); Shogo Shirakawa, Toyota (JP); Sho Hoshino, Kakegawa (JP); Minoru Ito, Kakegawa (JP); Naoto Fujita, Kakegawa (JP)

(72) Inventors: Isao Chinzei, Toyota (JP); Takumi Tojo, Miyoshi (JP); Shogo Shirakawa, Toyota (JP); Sho Hoshino, Kakegawa (JP); Minoru Ito, Kakegawa (JP); Naoto Fujita, Kakegawa (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 0 days.

(21) Appl. No.: 17/410,043

(22) Filed: Aug. 24, 2021

(65) Prior Publication Data

US 2022/0062884 A1  Mar. 3, 2022

(30) Foreign Application Priority Data

Aug. 28, 2020  (JP) .............................. JP2020-144020

(51) Int. Cl.
*B01J 35/00* (2006.01)
*B01J 23/46* (2006.01)
(Continued)

(52) U.S. Cl.
CPC ...... *B01J 35/0006* (2013.01); *B01D 53/9468* (2013.01); *B01J 21/14* (2013.01);
(Continued)

(58) Field of Classification Search
CPC ...... B01J 23/44; B01J 23/464; B01J 35/0006; B01J 35/023; B01J 35/04; B01D 53/9468; F01N 3/2803
(Continued)

(56) References Cited

U.S. PATENT DOCUMENTS 6,080,375 A * 6/2000 Mussmann .......... B01J 37/0246
                                                502/67
6,087,298 A * 7/2000 Sung .................... F01N 3/2803
                                                502/328
(Continued)

FOREIGN PATENT DOCUMENTS

JP  2016147256 A  8/2016
WO  2020/175142 A1  9/2020

OTHER PUBLICATIONS

Hiroki Nihashi et al., U.S. Appl. No. 7/435,007, filed Aug. 30, 2021.
(Continued)

*Primary Examiner* — Cam N. Nguyen
(74) *Attorney, Agent, or Firm* — Dickinson Wright, PLLC

(57) ABSTRACT

An exhaust gas purification device includes a substrate including an upstream end and a downstream end and having a length Ls; a first containing Pd particles, extending between the upstream end and a first position, and being in contact with the substrate; a second containing Rh particles, extending between the downstream end and a second position, and being in contact with the substrate; and a third catalyst layer containing Rh particles, extending between the upstream end and a third position, and being in contact with at least the first catalyst layer, wherein an average of a Rh particle size distribution is from 1.0 to 2.0 nm, and a standard deviation of the Rh particle size distribution is 0.8 nm or less in each of the second catalyst layer and the third catalyst layer.

5 Claims, 4 Drawing Sheets

(51) Int. Cl.
*B01J 35/02* (2006.01)
*B01J 35/04* (2006.01)
*B01J 21/14* (2006.01)
*F01N 3/28* (2006.01)
*B01D 53/94* (2006.01)
*B01J 23/44* (2006.01)

(52) U.S. Cl.
CPC .............. *B01J 23/44* (2013.01); *B01J 23/464* (2013.01); *B01J 35/023* (2013.01); *B01J 35/04* (2013.01); *F01N 3/2803* (2013.01); *B01D 2255/1023* (2013.01); *B01D 2255/1025* (2013.01); *B01D 2255/904* (2013.01); *B01D 2255/9025* (2013.01); *B01D 2255/9155* (2013.01); *B01D 2255/9202* (2013.01); *F01N 2370/02* (2013.01)

(58) Field of Classification Search
USPC ....... 502/258–262, 327, 334, 339, 355, 415, 502/439, 527.12, 527.13, 527.19
See application file for complete search history.

(56) References Cited

U.S. PATENT DOCUMENTS

| | | | |
|---|---|---|---|
| 6,375,910 B1 * | 4/2002 | Deeba | B01J 35/04 502/340 |
| 7,189,376 B2 * | 3/2007 | Kumar | F01N 3/28 422/177 |
| 7,517,510 B2 * | 4/2009 | Chen | B01J 37/0244 422/177 |
| 7,524,465 B2 * | 4/2009 | Kumar | B01J 23/44 422/180 |
| 7,550,124 B2 * | 6/2009 | Chen | F01N 13/0097 422/177 |
| 7,795,172 B2 * | 9/2010 | Foong | B01J 23/63 502/527.19 |
| 8,007,750 B2 * | 8/2011 | Chen | B01D 53/945 502/262 |
| 10,150,082 B2 * | 12/2018 | Yoshikawa | B01J 37/08 |
| 10,449,518 B2 * | 10/2019 | Markatou | B01J 23/42 |
| 10,512,898 B2 * | 12/2019 | Deeba | B01J 35/0006 |
| 11,224,861 B2 * | 1/2022 | Nakashima | F01N 3/101 |
| 11,331,651 B2 * | 5/2022 | Andersen | B01J 37/0219 |
| 2018/0141031 A1 * | 5/2018 | Nazarpoor | B01J 23/8986 |
| 2020/0102868 A1 * | 4/2020 | Fujimori | B01J 23/42 |

OTHER PUBLICATIONS

Hiroki Nihashi et al., U.S. Appl. No. 17/435,007, filed Aug. 30, 2021.

* cited by examiner

EXHAUST GAS PURIFICATION DEVICE

CROSS REFERENCE TO RELATED APPLICATIONS

The present application claims priority from Japanese patent application JP 2020-144020 filed on Aug. 28, 2020, the entire content of which is hereby incorporated by reference into this application.

BACKGROUND

Technical Field

The present disclosure relates to an exhaust gas purification device.

Background Art

An exhaust gas discharged from an internal combustion engine used in a vehicle, such as an automobile, contains a harmful substance, such as carbon monoxide (CO), hydrocarbon (HC), and nitrogen oxide (NOx). Regulations on emission amounts of these harmful substances have been tightened year by year. To remove these harmful substances, a noble metal, such as platinum (Pt), palladium (Pd), and rhodium (Rh), have been used as a catalyst.

Meanwhile, from an aspect of resource risk, reduction in usage of the noble metal catalyst has been demanded. As one method for reducing the usage of the noble metal in an exhaust gas purification device, there has been known a method in which a noble metal is supported on a carrier in a form of fine particles. For example, JP 2016-147256 A discloses a manufacturing method of a catalyst that includes a step of supporting noble metal particles on an oxide carrier to produce a noble metal supporting catalyst and a step of performing a heating process on the noble metal supported catalyst under reducing atmosphere to control a size of the noble metal particles within a predetermined range. The example of JP 2016-147256 A discloses that the particle sizes of the noble metal particles on the oxide carrier were able to be controlled in a range of 2.8 nm or more and 3.8 nm or less.

SUMMARY

Among the noble metals, Rh has NOx reduction activity. However, Rh particles whose particle sizes were controlled by the method described in JP 2016-147256 A were insufficient in durability at high temperature, which may cause sintering of the Rh particles under a high temperature condition, resulting in deterioration of catalytic activity in some cases.

The present disclosure provides an exhaust gas purification device that shows a high NOx conversion rate even after use under a high temperature condition.

According to one aspect of the present disclosure, there is provided an exhaust gas purification device including:

a substrate including an upstream end through which an exhaust gas is introduced into the device, and a downstream end through which the exhaust gas is discharged from the device, the substrate having a length Ls between the upstream end and the downstream end;

a first catalyst layer containing palladium particles, extending across a first region, and being in contact with the substrate, the first region extending between the upstream end and a first position, the first position being at a first distance La from the upstream end toward the downstream end;

a second catalyst layer containing rhodium particles, extending across a second region, and being in contact with the substrate, the second region extending between the downstream end and a second position, the second position being at a second distance Lb from the downstream end toward the upstream end; and a third catalyst layer containing rhodium particles, extending across a third region, and being in contact with at least the first catalyst layer, the third region extending between the upstream end and a third position, the third position being at a third distance of from the upstream end toward the downstream end, wherein an average of a particle size distribution of the rhodium particles contained in each of the second catalyst layer and the third catalyst layer is from 1.0 to 2.0 nm, and a standard deviation of the particle size distribution of the rhodium particles contained in each of the second catalyst layer and the third catalyst layer is 0.8 nm or less.

The exhaust gas purification device of the present disclosure shows a high NOx conversion rate even after use under a high temperature condition.

DETAILED DESCRIPTION

Figure 1:
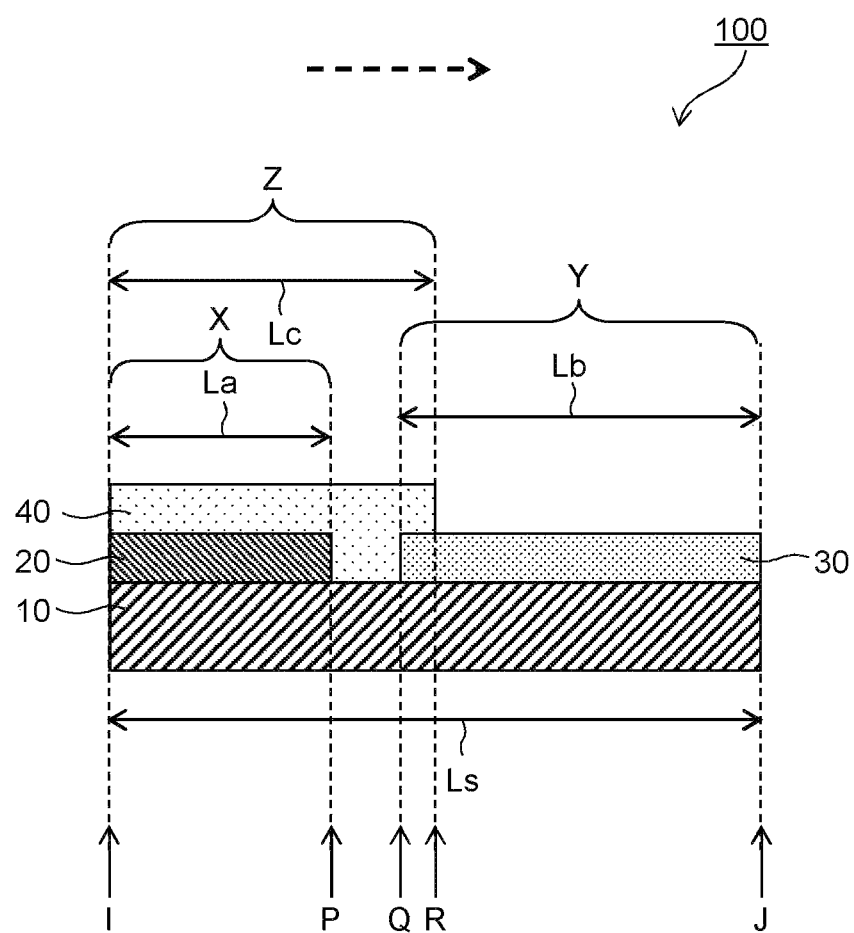
FIG. 1 is an enlarged end view of a main part of an exhaust gas purification device according to an embodiment taken along a surface parallel to a flow direction of an exhaust gas and schematically illustrating a configuration at a proximity of a partition wall of a substrate.

The following will describe embodiments of the present disclosure with reference to the drawings. In the drawings referred in the following description, same reference numerals are used for the same members or members having similar functions, and their repeated descriptions may be omitted in some cases. For convenience of explanation, a dimensional ratio in the drawings may differ from the actual ratio, and a part of a member may be omitted from the drawing in some cases. In this application, a numerical range expressed using the term "to" includes values described before and after the term "to" as the lower limit value and the upper limit value, respectively.

An exhaust gas purification device 100 according to the embodiment will be described with reference to FIGS. 1 and 2. The exhaust gas purification device 100 according to the embodiment includes a substrate 10, a first catalyst layer 20, a second catalyst layer 30, and a third catalyst layer 40.

(1) Substrate 10

The shape of the substrate 10 is not specifically limited. However, for example, as illustrated in FIG. 2, the substrate 10 may include a frame portion 12 and partition walls 16 that partition a space inside the frame portion 12 to define a plurality of cells 14. The frame portion 12 and the partition walls 16 may be integrally formed. The frame portion 12 may have any shape, such as a cylindrical shape, an elliptical cylindrical shape, or a polygonal cylindrical shape. The partition walls 16 extend between a first end (a first end surface) I and a second end (a second end surface) J of the substrate 10 to define the plurality of cells 14 extending between the first end I and the second end J. Each cell 14 may have any cross-sectional shape including: a quadrilateral shape, such as a square shape, a parallelogram, a rectangular shape, and a trapezoidal shape; a triangular shape; any polygonal shape (for example, a hexagonal shape and an octagonal shape); and a circular shape.

For example, the substrate 10 may be formed of a ceramic material having a high heat resistance, such as cordierite ($2MgO.2Al_2O_3.5SiO_2$), alumina, zirconia, and silicon carbide, or a metal material formed of a metal foil, such as a stainless-steel foil. From an aspect of cost, the substrate 10 may be made of cordierite in some embodiments.

Figure 2:
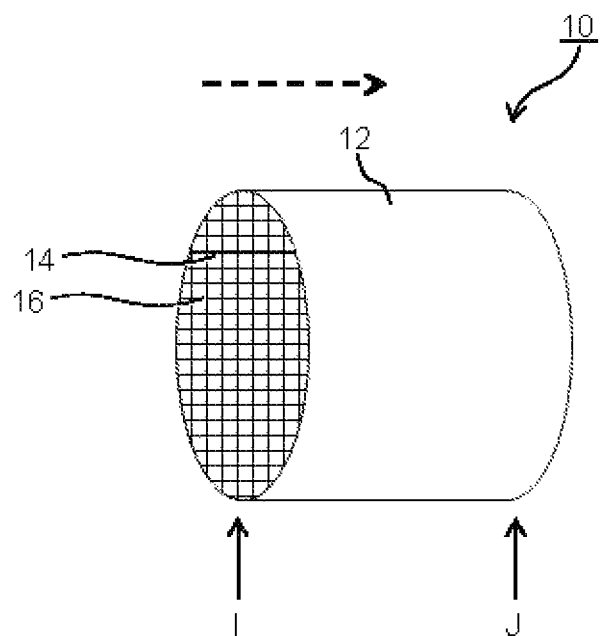
FIG. 2 is a perspective view schematically illustrating an example of the substrate.

In FIGS. 1 and 2, the dashed arrows indicate a flow direction of an exhaust gas in the exhaust gas purification device 100 and the substrate 10. The exhaust gas is introduced into the exhaust gas purification device 100 through the first end I and discharged from the exhaust gas purification device 100 through the second end J. Therefore, hereinafter, the first end I will also be referred to as an upstream end I and the second end J will also be referred to as a downstream end J as necessary. In this specification, a length between the upstream end I and the downstream end J, that is, the total length of the substrate 10 is denoted as Ls.

(2) First Catalyst Layer 20

The first catalyst layer 20 is in contact with the substrate 10 and extends across a first region X extending between the upstream end I and a first position P, which is at a first distance La from the upstream end I toward the downstream end J (that is, in the flow direction of the exhaust gas). The first distance La may be from 15 to 35% of the total length Ls of the substrate 10.

The first catalyst layer 20 contains palladium (Pd) particles. The Pd particles mainly function as a catalyst to oxidize HC. The amount of the Pd particles contained in the first catalyst layer 20 may be, for example, from 0.1 to 10 g/L based on a substrate capacity in the first region X, may be from 1 to 9 g/L based on a substrate capacity in the first region X in some embodiments, and may be from 3 to 7 g/L based on a substrate capacity in the first region X in some embodiments. This allows the exhaust gas purification device 100 to have a sufficiently high exhaust gas purification performance.

The Pd particles may be supported on carrier particles. The carrier particles are not specifically limited. For example, oxide carrier particles are usable as the carrier particles. The Pd particles can be supported by any supporting method, such as an impregnation supporting method, an adsorption supporting method, and a water-absorption supporting method.

Examples of the oxide carrier particles include particles of metal oxide, for example, particles of oxide of one or more metals selected from the group consisting of Group 3, Group 4, and Group 13 of the periodic table of elements, and lanthanoid-based metals. When the oxide carrier particles are particles of oxide of two or more metals, the oxide carrier particles may be a mixture of two or more metal oxides, may be composite oxide containing two or more metals, or may be a mixture of one or more metal oxides and one or more composite oxides.

For example, the metal oxide may be oxide of one or more metals selected from the group consisting of scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al). The metal oxide may be oxide of one or more metals selected from the group consisting of Y, La, Ce, Ti, Zr, and Al in some embodiments. Especially, the metal oxide may be alumina ($Al_2O_3$) or composite oxide of $Al_2O_3$ and lanthana ($La_2O_3$).

The amount of the carrier particles contained in the first catalyst layer 20 may be, for example, from 1 to 100 g/L based on the substrate capacity in the first region X, may be from 10 to 90 g/L based on the substrate capacity in the first region X in some embodiments, and may be from 30 to 70 g/L based on the substrate capacity in the first region X in some embodiments. This allows the exhaust gas purification device 100 to have a sufficiently high exhaust gas purification performance. The particle sizes of the carrier particles are not specifically limited and may be appropriately set.

With the use of the Pd particles supported on the carrier particles, the amount of the supported Pd particles may be, for example, 40 weight % or less, 30 weight % or less, 20 weight % or less, 15 weight % or less, 13 weight % or less, or 11 weight % or less based on the weight of the carrier particles, and the amount of the supported Pd particles may be, for example, 0.1 weight % or more, 0.5 weight % or more, 1 weight % or more, 5 weight % or more, 7 weight % or more, or 9 weight % or more based on the weight of the carrier particles.

The first catalyst layer 20 may further contain another optional ingredient. Examples of another optional ingredient include an Oxygen Storage Capacity (OSC) material that occludes oxygen in the atmosphere under oxygen excess atmosphere and releases oxygen under oxygen deficient atmosphere.

The OSC material is not specifically limited, and examples of which include cerium oxide (ceria: $CeO_2$), composite oxide containing ceria (for example, ceria-zirconia ($ZrO_2$) composite oxide (CZ or ZC composite oxide), and alumina ($Al_2O_3$)-ceria-zirconia composite oxide (ACZ composite oxide)). Especially, because of high oxygen storage capacity and relatively low-price, CZ composite oxide may be used in some embodiments. Composite oxide produced by further combining CZ composite oxide with lanthana ($La_2O_3$), yttria ($Y_2O_3$), or the like can also be used as an OSC material. A weight ratio of ceria to zirconia in ceria-zirconia composite oxide ($CeO_2/ZrO_2$) may be 0.1 to 1.0.

The amount of the OSC material contained in the first catalyst layer 20 may be, for example, from 1 to 100 g/L based on the substrate capacity in the first region X, may be from 10 to 90 g/L based on the substrate capacity in the first region X in some embodiments, and may be from 30 to 70 g/L based on the substrate capacity in the first region X in some embodiments. This allows the exhaust gas purification device 100 to have a sufficiently high exhaust gas purification performance.

The first catalyst layer 20 can be formed, for example, as follows. First, a slurry containing Pd particle precursors and carrier powder is prepared. Alternatively, a slurry containing carrier powder on which Pd particles are preliminarily supported may be prepared. The slurry may further contain an OSC material, a binder, an additive, or the like. Properties of the slurry, for example, viscosity and a particle diameter of a solid component may be appropriately adjusted. The prepared slurry is applied to the substrate 10 in the first region X. For example, the substrate 10 is dipped in the slurry from the upstream end I up to a depth corresponding to the first distance La, and after a predetermined time has passed, the substrate 10 is drawn from the slurry, thus allowing the substrate 10 in the first region X to be coated with the slurry. Alternatively, the slurry may be poured through the upstream end I of the substrate 10 into the cells 14, and a blower may blow the upstream end I to spread the slurry toward the downstream end J, thus allowing the substrate 10 to be coated with the slurry. Next, the slurry is dried and sintered at a predetermined temperature for a predetermined time. Thus, the first catalyst layer 20 in contact with the substrate 10 is formed in the first region X.

As the Pd particle precursor, an appropriate Pd salt of inorganic acid, for example, hydrochloride, nitrate, phosphate, sulfate, borate, and hydrofluoride, can be used.

(3) Second Catalyst Layer 30

The second catalyst layer 30 is in contact with the substrate 10 and extends across a second region Y extending between the downstream end J and a second position Q, which is at a second distance Lb from the downstream end J toward the upstream end I (that is, in a direction opposite to the flow direction of the exhaust gas). The second distance Lb may be from 40 to 65% of the total length Ls of the substrate 10. The length Ls, the first distance La, and the second distance Lb of the substrate may meet La+Lb<Ls. This allows the exhaust gas purification device 100 to have a high NOx conversion rate and a high THC conversion rate as shown in examples described later.

The second catalyst layer 30 contains rhodium (Rh) particles. The Rh particles mainly function as a catalyst to reduce NOx. The amount of the Rh particles contained in the second catalyst layer 30 may be, for example, from 0.05 to 5 g/L, from 0.1 to 0.8 g/L, or from 0.4 to 0.6 g/L based on the substrate capacity in the second region Y. This allows the exhaust gas purification device 100 to have a sufficiently high exhaust gas purification performance.

An average of a particle size distribution of the Rh particles contained in the second catalyst layer 30 is from 1.0 to 2.0 nm. Rh particles having an average particle size of 1.0 nm or more include a small number of fine Rh particles with the particle size of less than 1.0 nm, which are considered to aggregate and coarsen during a catalytic reaction. This allows prevention or reduction of deterioration of the catalytic ability of the Rh particles, thereby improving durability of the exhaust gas purification device 100. Additionally, Rh particles having an average particle size of 2.0 nm or less can have a large specific surface area, which allows the Rh particles to show a high catalytic activity.

The average of the particle size distribution of the Rh particles may be 1.1 nm or more, and may be 1.2 nm or more in some embodiments. The average of the particle size distribution of the Rh particles may be 1.9 nm or less, may be 1.8 nm or less in some embodiments, and may be 1.6 nm or less in some embodiments. The average of the particle size distribution of the Rh particles may be from 1.1 to 1.9 nm, and may be from 1.2 to 1.8 nm in some embodiments.

A standard deviation σ of the particle size distribution of the Rh particles contained in the second catalyst layer 30 is 0.8 nm or less. In this case, the particle size distribution of the Rh particles is sharp, which means that the Rh particles include a small number of fine Rh particles and coarse Rh particles. The small number of fine Rh particles allows prevention or reduction of the aggregation of the Rh particles during the catalytic reaction, thereby preventing or reducing deterioration of catalytic ability of the Rh particles and improving the durability of the exhaust gas purification device 100. The small number of coarse Rh particles leads to a large specific surface area of Rh particles, which allows improvement of the catalytic activity.

The standard deviation σ of the particle size distribution of the Rh particles may be 0.7 nm or less, may be 0.6 nm or less in some embodiments, and may be 0.5 nm or less in some embodiments. While the Rh particles may be monodispersed, the Rh particles having a particle size distribution with the standard deviation σ of 0.2 nm or more, 0.3 nm or more, or 0.4 nm or more allow improving the durability of the exhaust gas purification device 100.

The Rh particles having the particle size distribution as described above especially include a small number of fine particles with the particle size of less than 1.0 nm. This allows prevention or reduction of the aggregation of the Rh particles during the catalytic reaction, thereby preventing or reducing deterioration of catalytic ability of Rh, and improving the durability of the exhaust gas purification device 100. The amount of Rh particles with the particle size of less than 1.0 nm may be 5 weight % or less, 4 weight % or less, 3 weight % or less, 2 weight % or less, 1 weight % or less, 0.5 weight % or less, 0.3 weight % or less, or 0.1 weight % or less based on the total weight of the Rh particles in the second catalyst layer 30. Alternatively, the second catalyst layer 30 may contain no Rh particles with the particle size of less than 1.0 nm.

In this application, the particle size distribution of the Rh particles is on the number basis and is obtained by measuring a projected area circle equivalent diameter based on an image taken in observation with a transmission electron microscope (TEM) and analyzing particle groups including 100 or more particles.

The Rh particles may be supported on the carrier particles. The carrier particles are not specifically limited. For example, oxide carrier particles can be used as the carrier particles.

Examples of the oxide carrier particles include particles of metal oxide, for example, particles of oxide of one or more metals selected from the group consisting of Group 3, Group 4, and Group 13 of the periodic table of elements and lanthanoid-based metals. When the oxide carrier particles are particles of oxide of two or more metals, the oxide carrier particles may be a mixture of two or more metal oxides, may be composite oxide containing two or more metals, or may be a mixture of one or more metal oxides and one or more composite oxides.

For example, the metal oxide may be oxide of one or more metals selected from the group consisting of scandium (Sc), yttrium (Y), lanthanum (La), cerium (Ce), neodymium (Nd), samarium (Sm), europium (Eu), lutetium (Lu), titanium (Ti), zirconium (Zr), and aluminum (Al). The metal oxide may be oxide of one or more metals selected from the group consisting of Y, La, Ce, Ti, Zr, and Al in some embodiments. Especially, the metal oxide may be composite oxide of alumina, ceria, and zirconia. A trace amount of yttria, lanthana, and neodymium oxide ($Nd_2O_3$) may be added to the composite oxide of alumina, ceria, and zirconia to improve a heat resistance.

The amount of the carrier particles contained in the second catalyst layer 30 may be, for example, from 1 to 100 g/L based on the substrate capacity in the second region Y, may be from 10 to 90 g/L based on the substrate capacity in the second region Y in some embodiments, and may be from 30 to 70 g/L based on the substrate capacity in the second region Y in some embodiments. This allows the exhaust gas purification device 100 to have a sufficiently high exhaust gas purification performance. The particle sizes of the carrier particles are not specifically limited and may be appropriately set.

With the use of the Rh particles supported on the carrier particles, the amount of the supported Rh particles may be, for example, 7 weight % or less, 5 weight % or less, 3 weight % or less, 2 weight % or less, 1.5 weight % or less, or 1.2 weight % or less based on the weight of the carrier particles, and the amount of the supported Rh particles may be, for example, 0.01 weight % or more, 0.02 weight % or more, 0.05 weight % or more, 0.07 weight % or more, 0.1 weight % or more, 0.2 weight % or more, 0.5 weight % or more, or 0.9 weight % or more based on the weight of the carrier particles.

Rh particles may be supported on the carrier particles by bringing the carrier particles into contact with a Rh particle precursor dispersion liquid containing the Rh particle precursors having been controlled beforehand to have a predetermined particle size distribution, and subsequently sintering the resultant.

The Rh particle precursor dispersion liquid contains dispersion medium in a liquid form and the Rh particle precursors dispersed in the dispersion medium.

The dispersion medium may be aqueous medium, and may be water or a mixture of water and an aqueous organic solvent. Typically, the dispersion medium may be water.

The Rh particle precursors may be rhodium hydroxide. Here, the rhodium hydroxide is typically a compound in which Rh ions are bonded to the same number of hydroxyl groups as the valence of Rh ions, but may partially contain Rh—Rh bonding, may partially contain Rh-oxygen atom-Rh bonding, or may partially contain Rh-organic group bonding.

The Rh particle precursors are controlled in advance to have the predetermined particle size distribution, and may have a median diameter (D50) of 1.4 nm or more, 1.6 nm or more, 1.8 nm or more, or 2.0 nm or more, or may have a median diameter (D50) of 2.9 nm or less, 2.8 nm or less, 2.7 nm or less, 2.6 nm or less, 2.5 nm or less, or 2.4 nm or less. In this application, the particle size distribution and the median diameter of the Rh particle precursors in the Rh particle precursor dispersion liquid are measured by a dynamic light scattering method (DLS).

The Rh particle precursor dispersion liquid controlled to have the predetermined particle size distribution can be prepared by, for example, any of the following methods:

a) a method in which an acidic solution of a Rh compound reacts with a basic solution in a reactor whose reaction field has a clearance in a predetermined range (method 1); or b) a method in which an acidic solution of a Rh compound and a basic solution are mixed together and react with each other and subsequently the resultant is stirred in a high-speed mixer (method 2).

In the method 1, the reactor may include an appropriate clearance adjustment member and the like by which the clearance of the reaction field can be set to a predetermined value.

Introduction of the acidic solution of the Rh compound and the basic solution to the reaction field leads to a reaction of the acidic solution of the Rh compound with the basic solution at the reaction field, and the resultant is discharged from the reaction field. Here, since the clearance of the reaction field is set to have the predetermined value, a particle size of an insoluble component generated by the reaction between the acidic solution of the Rh compound and the basic solution is restricted by the clearance of the reaction field, and excessive increase in the particle size of the insoluble component is suppressed. Therefore, the particle size distribution of the prepared Rh particle precursors in the Rh particle precursor dispersion liquid can be controlled.

The clearance adjustment member in the reactor may be two flat plates, a combination of a flat plate and a wave-shaped plate, a narrow tube, and the like.

When the clearance adjustment members are two flat plates, the two flat plates are disposed at a predetermined interval. A gap between the two flat plates becomes the reaction field, and a distance between the two flat plates becomes the clearance of the reaction field. At least one of the two flat plates may have a slit. The two flat plates may be rotated relative to each other or moved parallel to each other during the reaction. The planar shape of the flat plate may be any shape, for example, a rectangular shape, a circular shape (a disk shape), and a multangular shape.

When the clearance adjustment members are the combination of the flat plate and the wave-shaped plate, they are disposed to be in contact with one another. A gap of a recessed portion of the flat plate and the wave-shaped plate becomes the reaction field, and a depth of the recessed portion becomes the clearance of the reaction field. The flat plate and the wave-shaped plate may be rotated relative to each other or moved parallel to each other during the reaction. The planar shapes of the flat plate and the wave-shaped plate may be any shape, for example, a rectangle, a circular shape (a disk shape), and a multangular shape.

When the clearance adjustment member is the thin pipe, the inside of the pipe becomes the reaction field, and the inner diameter of the thin pipe becomes the clearance of the reaction field.

The clearance of the reaction field may be appropriately set depending on the desired particle size distribution of the Rh particle precursor. For example, the clearance of the reaction field may be 1 µm or more, 2 µm or more, 4 µm or more, 6 µm or more, 8 µm or more, 10 µm or more, 15 µm or more, 20 µm or more, 25 µm or more, or 30 µm or more. The clearance of the reaction field may be 50 µm or less, 45 µm or less, 40 µm or less, 35 µm or less, 30 µm or less, 25 µm or less, or 20 µm or less.

Examples of the reactor in which the clearance of the reaction field is set in the predetermined range include a micro reactor including an appropriate clearance adjustment member. It is allowable to use a commercially available reactor.

In the method 2, the acidic solution of the Rh compound and the basic solution are mixed together and react with each other to generate Rh particle precursors having large particle sizes. Next, a reaction solution is introduced into a stirring tank of the high-speed mixer and is stirred at high speed. The Rh particle precursors in the reaction solution are pressed against the inner wall of the stirring tank due to centrifugal force, and a movement of the Rh particle precursors relative to the inner wall is suppressed. Meanwhile, the dispersion medium in the reaction solution continues flowing with rotating inside the stirring tank. The rotational flow of the dispersion medium in the stirring tank applies strong shear stress to the Rh particle precursors pressed against the inner wall of the stirring tank. The shear stress reduces the sizes of the coarse Rh particle precursors. This allows controlling the particle size distribution of the Rh particle precursors in the prepared Rh particle precursor dispersion liquid.

As the high-speed mixer, for example, a high-speed mixer at a peripheral velocity of 6 m/sec or more or the like can be used. It is allowable to use a commercially available high-speed mixer.

The acidic solution of the Rh compound used in the method 1 and the method 2 may be a solution produced by dissolving the Rh compound in an appropriate solvent.

The Rh compound may be an appropriate Rh salt of inorganic acid, and may be, for example, hydrochloride, nitrate, phosphate, sulfate, borate, or hydrofluoride.

The solvent of the acidic solution of the Rh compound may be aqueous medium, and may be water or a mixture of water and an aqueous organic solvent. Typically, the solvent may be water.

The pH of the acidic solution of the Rh compound is less than 7.0, and may be, for example, 6.0 or less, 5.0 or less, 4.0 or less, 3.0 or less, 2.0 or less, or 1.0 or less, and/or may be 0.1 or more, 0.3 or more, 0.5 or more, 0.7 or more, or 1.0 or more.

The basic solution used in the method 1 and the method 2 may be a solution produced by dissolving a base, specifically an organic base, in an appropriate solvent.

The organic base may be a nitrogen-containing organic compound, and may be selected from an amine compound, a heterocyclic compound containing a nitrogen atom as a ring member, or the like. Examples of the amine compound include trimethylamine, triethylamine, tetramethylammonium hydroxide, tetraethylammonium hydroxide, and dimethylaminonaphthalen. Examples of the heterocyclic compound containing the nitrogen atom as the ring member includes, for example, pyridine and diazabicycloundecene.

The solvent of the basic solution may be aqueous medium, and may be water or a mixture of water and an aqueous organic solvent. Typically, the solvent may be water.

The pH of the basic solution is more than 7.0, and may be, for example, 8.0 or more, 9.0 or more, 10.0 or more, 11.0 or more, 12.0 or more, or 13.0 or more, and/or may be 14.0 or less, 13.5 or less, 13.0 or less, 12.5 or less, or 12.0 or less.

In the method 1 and the method 2, the Rh particle precursor dispersion liquid obtained by the reaction of the acidic solution of the Rh compound with the basic solution may be basic (alkaline) or may be acidic. To prepare a basic Rh particle precursor dispersion liquid, a mole ratio of the base to the Rh compound (base/Rh compound) may be, for example, 2 or more, 5 or more, 10 or more, 15 or more, or 20 or more, and/or may be 100 or less, 75 or less, 50 or less, 40 or less, 30 or less, or 20 or less. To prepare an acidic Rh particle precursor dispersion liquid, a mole ratio of the base to the Rh compound (base/Rh compound) may be 1 or less.

In the method 1 and the method 2, a reaction temperature may be appropriately set in the range of −10 to 100° C., and may be, for example, room temperature. The reaction time may be appropriately set depending on the type of the reactor, for example, within the range of 0.1 seconds to one hour.

The second catalyst layer 30 may further contain another optional ingredient. Examples of another optional ingredient include an OSC material.

The OSC material is not specifically limited, and examples of which include ceria and composite oxide containing ceria (for example, CZ composite oxide and ACZ composite oxide). Especially, because of high oxygen storage capacity and relatively low-price, CZ composite oxide may be used in some embodiments. Composite oxide produced by further combining the CZ composite oxide with lanthana ($La_2O_3$), yttria ($Y_2O_3$), or the like can also be used as an OSC material. A weight ratio of the ceria to the zirconia in the ceria-zirconia composite oxide ($CeO_2/ZrO_2$) may be 0.1 to 1.0.

The amount of the OSC material contained in the second catalyst layer 30 may be, for example, from 10 to 200 g/L based on the substrate capacity in the second region Y, may be from 50 to 100 g/L based on the substrate capacity in the second region Y in some embodiments, and may be from 80 to 120 g/L based on the substrate capacity in the second region Y in some embodiments. This allows the exhaust gas purification device 100 to have a sufficiently high exhaust gas purification performance.

The second catalyst layer 30 can be formed, for example, as follows. First, a slurry containing Rh particle precursor and carrier powder is prepared. Alternatively, a slurry containing carrier powder on which Rh particles are preliminarily supported may be prepared. The slurry may further contain an OSC material, a binder, an additive, or the like. Properties of the slurry, for example, viscosity and a particle diameter of a solid component may be appropriately adjusted. The prepared slurry is applied to the substrate 10 in the second region Y. For example, the substrate 10 is dipped in the slurry from the downstream end J up to a depth corresponding to the second distance Lb, and after a predetermined time has passed, the substrate 10 is drawn from the slurry, thus allowing the substrate 10 in the second region Y to be coated with the slurry. Alternatively, the slurry may be poured through the downstream end J of the substrate 10 into the cells 14, and blower may blow the downstream end J to spread the slurry toward the upstream end I, thus allowing the substrate 10 to be coated with the slurry. Next, the slurry is dried and sintered at a predetermined temperature for a predetermined time. Thus, the second catalyst layer 30 in contact with the substrate 10 is formed in the second region Y.

(4) Third Catalyst Layer 40

The third catalyst layer 40 is in contact with at least the first catalyst layer 20 and extends across a third region Z extending between the upstream end I and a third position R, which is at a third distance Lc from the upstream end I toward the downstream end J (that is, in the flow direction of the exhaust gas). The third distance Lc may be from 40 to 70% of the total length Ls of the substrate 10. The first distance La and the third distance Lc may meet La<Lc. That is, the first region X across which the first catalyst layer 20 extends may be included in the third region Z across which the third catalyst layer 40 extends. Furthermore, the length Ls of the substrate, the second distance Lb, and the third distance Lc may meet Lb+Lc>Ls. That is, the second region Y across which the second catalyst layer 30 extends may overlap with the third region Z across which the third catalyst layer 40 extends. This allows the exhaust gas purification device 100 to have a high exhaust gas purification performance.

The third catalyst layer 40 contains rhodium (Rh) particles. The Rh particles mainly function as a catalyst to reduce NOx. The amount of the Rh particles contained in the third catalyst layer 40 may be, for example, from 0.02 to 2 g/L, from 0.05 to 0.7 g/L, or from 0.2 to 0.4 g/L based on the substrate capacity in the third region Z. This allows the exhaust gas purification device 100 to have a sufficiently high exhaust gas purification performance.

An average of a particle size distribution of the Rh particles contained in the third catalyst layer 40 is from 1.0 to 2.0 nm. Rh particles having an average particle size of 1.0 nm or more include a small number of fine Rh particles with the particle size of less than 1.0 nm, which are considered to aggregate and coarsen during a catalytic reaction. This allows preventing or reduction of deterioration of the catalytic ability of the Rh particles, thereby improving durability of the exhaust gas purification device 100. Additionally, Rh particles having an average particle size of 2.0 nm or less can have a large specific surface area, which allows the Rh particles to show a high catalytic activity.

The average of the particle size distribution of the Rh particles may be 1.1 nm or more, and may be 1.2 nm or more in some embodiments. The average of the particle size distribution of the Rh particles may be 1.9 nm or less, may be 1.8 nm or less in some embodiments, and may be 1.6 nm or less in some embodiments. The average of the particle size distribution of the Rh particles may be from 1.1 to 1.9 nm, and may be from 1.2 to 1.8 nm in some embodiments.

The standard deviation σ of the particle size distribution of the Rh particles contained in the third catalyst layer 40 is 0.8 nm or less. In this case, the particle size distribution of the Rh particles is sharp, which means that the Rh particles include a small number of fine Rh particles and coarse Rh particles. The small number of fine Rh particles allows prevention or reduction of the aggregation of the Rh particles during the catalytic reaction, thereby preventing or reducing deterioration of catalytic ability of the Rh particles and improving the durability of the exhaust gas purification device 100. The small number of coarse Rh particles leads to a large specific surface area of Rh particles, which allows improvement of the catalytic activity.

The standard deviation 6 of the particle size distribution of Rh particles may be 0.7 nm or less, may be 0.6 nm or less in some embodiments, and may be 0.5 nm or less in some embodiments. While the Rh particles may be monodispersed, the Rh particles having a particle size distribution with the standard deviation σ of 0.2 nm or more, 0.3 nm or more, or 0.4 nm or more allows improving the durability of the exhaust gas purification device 100.

The Rh particles having the particle size distribution as described above especially include a small number of fine particles with the particle size of less than 1.0 nm. This allows prevention or reduction of the aggregation of the Rh particles during the catalytic reaction, thereby preventing or reducing deterioration of catalytic ability of the Rh particles, and improving the durability of the exhaust gas purification device 100. The amount of Rh particles with the particle size of less than 1.0 nm may be 5 weight % or less, 4 weight % or less, 3 weight % or less, 2 weight % or less, 1 weight % or less, 0.5 weight % or less, 0.3 weight % or less, or 0.1 weight % or less based on the total weight of the Rh particles in the third catalyst layer 40. Alternatively, the third catalyst layer 40 may contain no Rh particles with the particle size of less than 1.0 nm.

The Rh particles may be supported on the carrier particles. The carrier particles are not specifically limited. For example, oxide carrier particles can be used as the carrier particles.

As the oxide carrier particles, the material similar to the material that can be used for the second catalyst layer 30 can be used.

The amount of the carrier particles contained in the third catalyst layer 40 may be, for example, from 1 to 100 g/L based on the substrate capacity in the third region Z, may be from 10 to 50 g/L based on the substrate capacity in the third region Z in some embodiments, and may be from 30 to 40 g/L based on the substrate capacity in the third region Z in some embodiments. This allows the exhaust gas purification device 100 to have a sufficiently high exhaust gas purification performance. The particle sizes of the carrier particles are not specifically limited and may be appropriately set.

With the use of the Rh particles supported on the carrier particles, the amount of the supported Rh particles may be, for example, 7 weight % or less, 5 weight % or less, 3 weight % or less, 2 weight % or less, or 1 weight % or less based on the weight of the carrier particles, and the amount of the supported Rh particles may be, for example, 0.01 weight % or more, 0.02 weight % or more, 0.05 weight % or more, 0.07 weight % or more, 0.1 weight % or more, 0.2 weight % or more, 0.4 weight % or more, 0.6 weight % or more, or 0.7 weight % or more based on the weight of the carrier particles.

Rh particles may be supported on the carrier particles by bringing the carrier particles into contact with a Rh particle precursor dispersion liquid containing the Rh particle precursors having been controlled beforehand to have a predetermined particle size distribution, and subsequently sintering the resultant.

The Rh particle precursor dispersion liquid controlled to have the predetermined particle size distribution can be prepared by the method 1 or the method 2, which has been described in the section of "(3) Second Catalyst Layer 30."

The third catalyst layer 40 may further contain another optional ingredient. Examples of another optional ingredient include an OSC material.

As the OSC material, the OSC material that has been described in the section of "(3) Second Catalyst Layer 30" can be used.

The amount of the OSC material contained in the third catalyst layer 40 may be, for example, from 10 to 120 g/L based on the substrate capacity in the third region Z, may be from 40 to 90 g/L based on the substrate capacity in the third region Z in some embodiments, and may be from 60 to 70 g/L based on the substrate capacity in the third region Z in some embodiments. This allows the exhaust gas purification device 100 to have a sufficiently high exhaust gas purification performance.

The amount of the Rh particles contained in the third catalyst layer 40 may be more than 0% and less than 50% based on the total weight of the Rh particles contained in the second catalyst layer 30 and the third catalyst layer 40. This allows the exhaust gas purification device 100 to have an improved THC conversion rate, as will be described in the examples described later. Furthermore, the amount of the Rh particles contained in the third catalyst layer 40 may be more than 10% and less than 50%, specifically 20% or more and less than 50% based on the total weight of the Rh particles contained in the second catalyst layer 30 and the third catalyst layer 40. This allows achieving an improvement of both of the NOx conversion rate and THC conversion rate in the exhaust gas purification device 100, as will be described in the examples described later.

The third catalyst layer 40 can be formed, for example, as follows. First, a slurry containing Rh particle precursor and carrier powder is prepared. Alternatively, a slurry containing carrier powder on which Rh particles are preliminarily supported may be prepared. The slurry may further contain an OSC material, a binder, an additive, or the like. Properties of the slurry, for example, viscosity and a particle diameter of a solid component may be appropriately adjusted. The prepared slurry is applied to the third region Z of the substrate 10 on which at least the first catalyst layer 20 has been formed. For example, the substrate 10 is dipped in the slurry from the upstream end I up to a depth corresponding to the third distance Lc, and after a predetermined time has passed, the substrate 10 is drawn from the slurry, thus allowing the slurry to be applied at least on the first catalyst layer 20 in the third region Z. Alternatively, the slurry may be poured through the upstream end I of the substrate 10 into the cells 14, and blower may blow the upstream end I to spread the slurry toward the downstream end J, thus allowing the slurry to be applied at least on the first catalyst layer 20. Next, the slurry is dried and sintered at a predetermined temperature for a predetermined time. Thus, the third catalyst layer 40 in contact with at least the first catalyst layer 20 is formed in the third region Z.

Figure 3:
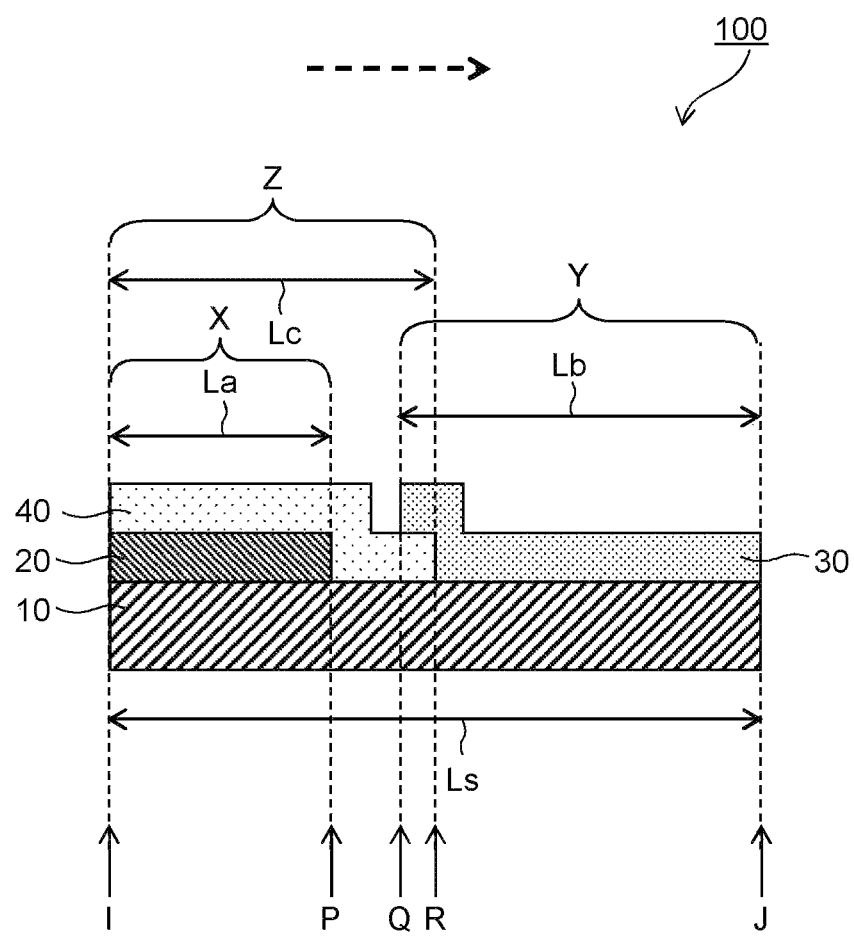
FIG. 3 is an enlarged end view of a main part of an exhaust gas purification device according to a modified embodiment taken along a surface parallel to a flow direction of an exhaust gas and schematically illustrating a configuration at a proximity of a partition wall of a substrate.

Note that the formation of the third catalyst layer 40 may be performed either before or after the formation of the second catalyst layer 30. When the second catalyst layer 30 is formed and the third catalyst layer 40 is subsequently formed, the third catalyst layer 40 in an overlapping region of the second region Y with the third region Z lies on the second catalyst layer 30 as illustrated in FIG. 1. When the third catalyst layer 40 is formed and the second catalyst layer 30 is subsequently formed, the second catalyst layer 30 in an overlapping region of the second region Y with the third region Z lies on the third catalyst layer 40 as illustrated in FIG. 3.

The exhaust gas purification device 100 according to the embodiment is applicable to various vehicles including an internal combustion engine.

While the embodiments of the present disclosure have been described in detail above, the present disclosure is not limited thereto, and can be subjected to various kinds of changes in design without departing from the spirit of the present disclosure described in the claims.

EXAMPLES

The following will specifically describe the present disclosure with the examples, but the present disclosure is not limited to these examples.

(1) Materials Used in Examples and Comparative Examples
a) Substrate (honeycomb substrate)
Material: cordierite
Capacity: 875 cc
Thickness of partition wall: 2 mil (50.8 μm)
Cell density: 600 pieces per square inch
Cross-sectional shape of cell: hexagonal shape
b) Material 1
Composite of $Al_2O_3$ and $La_2O_3$ ($La_2O_3$: 1 wt % to 10 wt %)
c) Material 2
A material produced by adding trace amounts of $Nd_2O_3$, $La_2O_3$, and $Y_2O_3$ to ACZ ($Al_2O_3$—$CeO_2$—$ZrO_2$) composite oxide ($CeO_2$: 15 to 30 wt %) and treating the resultant to increase its heat resistance
d) Material 3
CZ ($CeO_2$—$ZrO_2$) composite oxide ($CeO_2$: 40 wt %, $ZrO_2$: 50 wt %, $La_2O_3$: 5 wt %, $Y_2O_3$: 5 wt %)
e) Material 4
CZ ($CeO_2$—$ZrO_2$) composite oxide ($CeO_2$: 20 wt %, $ZrO_2$: 70 wt %, $La_2O_3$: 5 wt %, $Y_2O_3$: 5 wt %)
f) Material 5
Palladium nitrate
g) Material 6
Rhodium nitrate
h) Material 7
Rh particle precursor dispersion liquid prepared as follows 0.2 g of rhodium nitrate (III) was dissolved in 50 mL of ion exchanged water to prepare an aqueous solution of rhodium nitrate (RN) (pH 1.0). Additionally, an aqueous solution of tetraethylammonium hydroxide (TEAH) (pH 14) at a concentration of 175 g/L was prepared. In a reactor (a micro reactor) including two flat plates as clearance adjustment members, the RN aqueous solution reacted with the TEAH aqueous solution. Specifically, the RN aqueous solution and the TEAH aqueous solution were introduced into a reaction field with a clearance of 10 μm at a mole ratio of TEAH:RN=18:1 and reacted with each other, thus the Rh particle precursor dispersion liquid was prepared. The obtained dispersion liquid had a pH of 14. The Rh particle precursors in the dispersion liquid had a median diameter (D50) of 2.0 nm, which was determined by dynamic light scattering method (DLS).
i) Material 8
Barium sulfate (2) Evaluation for Rh Particles Made from Material 6
0.2 g of the material 6 was dissolved in 50 mL of ion exchanged water to prepare an aqueous solution of rhodium nitrate (pH1.0). After the rhodium nitrate aqueous solution was brought into contact with alumina such that the mass of Rh be 0.5% based on the mass of the alumina, the resultant was sintered. Thus, the Rh particles were supported on the alumina.

Through observation with a Scanning Transmission Electron Microscope (STEM), a particle size distribution of Rh particles supported on the alumina was examined. The average of the particle size distribution of Rh particles was 0.7 nm, and the standard deviation of the particle size distribution was 0.48 nm.

(3) Evaluation for Rh Particles Made from Material 7
After the material 7 was brought into contact with alumina such that the mass of Rh be 0.5% based on the mass of the alumina, the resultant was sintered. Thus, the Rh particles were supported on the alumina.

Through observation with a Scanning Transmission Electron Microscope (STEM), a particle size distribution of Rh particles supported on the alumina was examined. The average of the particle size distribution of Rh particles was 1.4 nm, and the standard deviation of the particle size distribution was 0.48 nm.

(4) Manufacturing Exhaust Gas Purification Device

Examples 1 to 5

While distilled water was stirred, the material 1, the material 3, the material 5, the material 8, and an $Al_2O_3$-based binder were added to the distilled water to prepare a suspended slurry 1. The prepared slurry 1 was poured through one end (an upstream end) of a substrate into the cells, and excess slurry was blown off with a blower. Consequently, partition walls of the substrate were coated with the slurry 1 in the first region extending between the one end of the substrate and the first position, which was at a distance of 35% of the total length of the substrate from the one end of the substrate toward the other end (the downstream end) of the substrate. The substrate was placed in a drying machine, inside of which was held at 120° C., for two hours to vaporize water contained in the slurry 1. Next, the substrate was baked in an electric furnace at 500° C. for two hours. Thus, a first catalyst layer was formed.

At this time, the amount of the material 1 contained in the first catalyst layer was 50 g/L, the amount of the material 3 contained in the first catalyst layer was 50 g/L, the amount of Pd derived from the material 5 and contained in the first catalyst layer was 5 g/L, and the amount of the material 8 contained in the first catalyst layer was 5 g/L, each of which is based on the capacity of the substrate in the first region.

Next, while distilled water was stirred, the material 1, the material 2, the material 4, the material 7, and an $Al_2O_3$-based binder were added to the distilled water to prepare a suspended slurry 2. The prepared slurry 2 was poured through the other end (the downstream end) of the substrate into the cells, and excess slurry was blown off with a blower. Consequently, the partition walls of the substrate were coated with the slurry 2 in the second region extending between the other end of the substrate and the second position, which was at a distance of 55% of the total length of the substrate from the other end of the substrate toward the one end (the upstream end) of the substrate. The substrate was placed in the drying machine, inside of which was held at 120° C., for two hours to vaporize water contained in the slurry 2. Next, the substrate was baked in the electric furnace at 500° C. for two hours. Thus, a second catalyst layer was formed.

At this time, the amount of the material 1 contained in the second catalyst layer was 50 g/L, the amount of the material 2 contained in the second catalyst layer was 50 g/L, the amount of the material 4 contained in the second catalyst layer was 50 g/L, and the amount of Rh derived from the material 7 and contained in the second catalyst layer was as described in Table 1, each of which is based on the capacity of the substrate in the second region.

Next, while distilled water was stirred, the material 1, the material 2, the material 4, the material 7, and an $Al_2O_3$-based binder were added to the distilled water to prepare a suspended slurry 3. The prepared slurry 3 was poured through one end (the upstream end) of the substrate into the cells, and excess slurry was blown off with a blower. Consequently, a layer of the slurry 3 was formed in the third region extending between the one end of the substrate and the third position, which was at a distance of 50% of the total length of the substrate from the one end of the substrate toward the other end (the downstream end) of the substrate. The substrate was placed in the drying machine, inside of which was held at 120° C., for two hours to vaporize water contained in the slurry 3. Next, the substrate was baked in the electric furnace at 500° C. for two hours. Thus, a third catalyst layer was formed.

At this time, the amount of the material 1 contained in the third catalyst layer was 33 g/L, the amount of the material 2 contained in the third catalyst layer was 33 g/L, the amount of the material 4 contained in the third catalyst layer was 33 g/L, and the amount of Rh derived from the material 7 and contained in the third catalyst layer was as described in Table 1, each of which is based on the capacity of the substrate in the third region.

Thus, the exhaust gas purification devices of examples 1 to 5 were manufactured. The amounts of Rh contained in the third catalyst layers based on the total weights of Rh contained in the second catalyst layers and the third catalyst layers were as described in Table 1.

Example 6

An exhaust gas purification device was manufactured similarly to Example 3 except that the second position was at a distance of 80% of the total length of the substrate from the other end (the downstream end) of the substrate toward one end (the upstream end) of the substrate.

Comparative Examples 1 to 3

An exhaust gas purification device was manufactured similarly to Example 1 except that the material 6 was used instead of the material 7 in the formation of the second catalyst layer and the third catalyst layer and the amount of Rh derived from the material 6 and contained in each of the second catalyst layer and the third catalyst layer was as described in Table 1.

(5) Exhaust Gas Purification Performance Evaluation

The exhaust gas purification devices of Examples 1 to 6 and Comparative Examples 1 to 3 were each coupled to an exhaust system of a V-8 engine. While a stoichiometric mixture of air and fuel (an air-fuel ratio A/F=14.6) and a mixture containing excess oxygen (lean: A/F>14.6) were introduced into the engine alternately with a time ratio of 3:1 in a fixed cycle, a bed temperature of each of the exhaust gas purification devices was maintained at 950° C. for 50 hours. Thus, each of the exhaust gas purification devices was aged.

Next, the exhaust gas purification devices were each coupled to an exhaust system of an L-4 engine. An air-fuel mixture with an air-fuel ratio A/F of 14.4 was supplied to the engine, and an operation condition of the engine was controlled such that a temperature of an exhaust gas introduced into each of the exhaust gas purification devices be 550° C.

Figure 4:
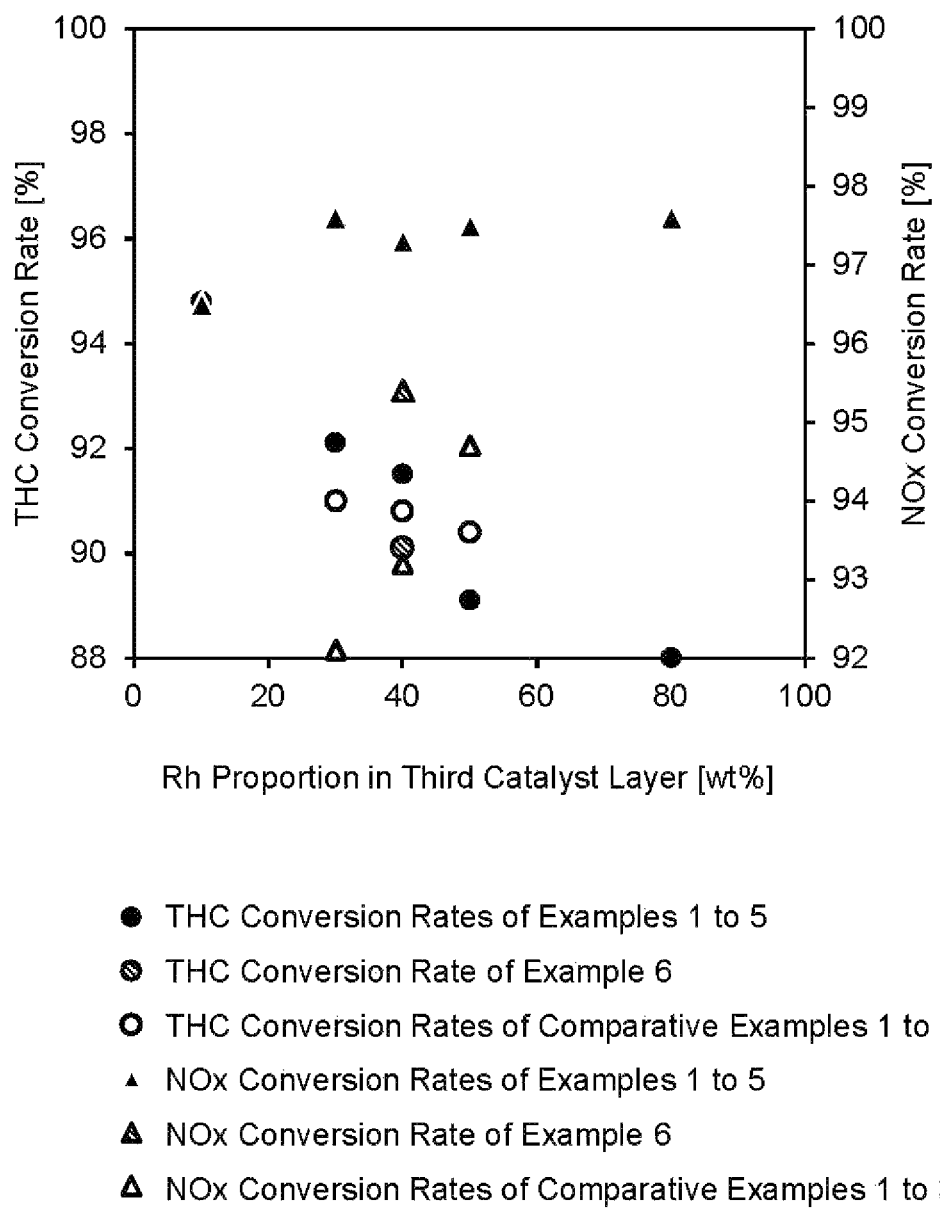
FIG. 4 is a graph illustrating NOx conversion rates and total hydrocarbon (THC) conversion rates of exhaust gas purification devices of examples and comparative examples.

NOx content in the gas introduced into each of the exhaust gas purification devices and NOx content in the gas discharged from each of the exhaust gas purification devices were measured to obtain (the NOx content in the gas discharged from the exhaust gas purification device)/(the NOx content in the gas introduced into the exhaust gas purification device) as a NOx conversion rate. Additionally, total hydrocarbons (THC) content in the gas introduced into each of the exhaust gas purification devices and total hydrocarbons (THC) content in the gas discharged from each of the exhaust gas purification devices were measured to obtain (the THC content in the gas discharged from the exhaust gas purification device)/(the THC content in the gas introduced into the exhaust gas purification device) as a THC conversion rate. Table 1 and FIG. 4 show the results.

All of the exhaust gas purification devices of Examples 1 to 6 exhibited the NOx conversion rates higher than those of the exhaust gas purification devices of Comparative Examples 1 to 3. It is considered that, in Examples 1 to 6, the use of the material 7 for formation of the second catalyst layers and the third catalyst layers brought Rh particles in each of the second catalyst layers and the third catalyst layers to have an average of the particle size distribution from 1.0 to 2.0 nm and a standard deviation of the particle size distribution of 0.8 nm or less, which leads to prevention or reduction of sintering of the Rh particles, thus resulting in high NOx conversion rates.

Additionally, the exhaust gas purification device of Example 3 in which the length Ls of the substrate, the first distance La, and the second distance Lb met La+Lb<Ls exhibited the NOx conversion rate and the THC conversion rate higher than those of the exhaust gas purification device of Example 6. It is considered that, in Example 3, satisfying the inequality La+Lb<Ls prevented the Rh particles in the second catalyst layer from being brought into contact with the Pd particles in the first catalyst layer, thereby preventing degradation of the Rh particles and the Pd particles which may otherwise be caused by formation of an alloy from Rh particles and the Pd particles.

Especially, the exhaust gas purification devices of Examples 2 to 5 in which the amounts of the Rh particles contained in the third catalyst layers were more than 10% based on the total weights of the Rh particles exhibited the NOx conversion rates higher than that of the exhaust gas purification device of Example 1 in which the amount of the Rh particles contained in the third catalyst layer was 10% based on the total weight of the Rh particles. Additionally, the exhaust gas purification devices of Examples 1 to 3 in which the amounts of the Rh particles contained in the third catalyst layers were more than 0% and less than 50% based on the total weights of Rh particles exhibited the THC conversion rates higher than those of the exhaust gas purification devices of Examples 4 and 5 in which the amounts of the Rh particles contained in the third catalyst layers were 50% or more based on the total weights of the Rh particles. Consequently, the exhaust gas purification devices of Examples 2 and 3 in which the amounts of the Rh particles contained in the third catalyst layer were more than 10% and less than 50% based on the total weight of the Rh particles, especially 20% or more and less than 50% based on the total weight of the Rh particles, were able to achieve both of the higher NOx conversion rate and the higher THC conversion rate.

TABLE 1

| | | Second Catalyst Layer | | Third Catalyst Layer Rh Content [g/L] | Rh Content in Third Catalyst Layer Based on Rh Total Weight [wt %] | THC Conversion Rate [%] | NOx Conversion Rate [%] |
|---|---|---|---|---|---|---|---|
| | Rh Precursor | Rh Content [g/L] | Coating Length Based on Total Length of Substrate [%] | | | | |
| Example 1 | Material 7 | 0.72 | 55 | 0.08 | 10 | 94.8 | 96.5 |
| Example 2 | Material 7 | 0.56 | 55 | 0.24 | 30 | 92.1 | 97.6 |
| Example 3 | Material 7 | 0.48 | 55 | 0.32 | 40 | 91.5 | 97.3 |
| Example 4 | Material 7 | 0.40 | 55 | 0.40 | 50 | 89.1 | 97.5 |
| Example 5 | Material 7 | 0.16 | 55 | 0.64 | 80 | 88 | 97.6 |
| Example 6 | Material 7 | 0.48 | 80 | 0.32 | 40 | 90.1 | 95.4 |
| Comparative Example 1 | Material 6 | 0.56 | 55 | 0.24 | 30 | 91 | 92.1 |
| Comparative Example 2 | Material 6 | 0.48 | 55 | 0.32 | 40 | 90.8 | 93.2 |
| Comparative Example 3 | Material 6 | 0.40 | 55 | 0.40 | 50 | 90.4 | 94.7 |

What is claimed is:

1. An exhaust gas purification device comprising:

a substrate including an upstream end through which an exhaust gas is introduced into the device, and a downstream end through which the exhaust gas is discharged from the device, the substrate having a length Ls between the upstream end and the downstream end;

a first catalyst layer containing palladium particles, extending across a first region, and being in contact with the substrate, the first region extending between the upstream end and a first position, the first position being at a first distance La from the upstream end toward the downstream end;

a second catalyst layer containing rhodium particles, extending across a second region, and being in contact with the substrate, the second region extending between the downstream end and a second position, the second position being at a second distance Lb from the downstream end toward the upstream end; and a third catalyst layer containing rhodium particles, extending across a third region, and being in contact with at least the first catalyst layer, the third region extending between the upstream end and a third position, the third position being at a third distance Lc from the upstream end toward the downstream end, wherein an average of a particle size distribution of the rhodium particles contained in each of the second catalyst layer and the third catalyst layer is from 1.0 to 2.0 nm, and a standard deviation of the particle size distribution of the rhodium particles contained in each of the second catalyst layer and the third catalyst layer is 0.8 nm or less.

2. The exhaust gas purification device according to claim 1, wherein the length Ls of the substrate, the first distance La, and the second distance Lb meet La+Lb<Ls.

3. The exhaust gas purification device according to claim 1, wherein an amount of the rhodium particles contained in the third catalyst layer is more than 0% and less than 50% based on a total weight of the rhodium particles contained in the second catalyst layer and the third catalyst layer.

4. The exhaust gas purification device according to claim 3, wherein the amount of the rhodium particles contained in the third catalyst layer is more than 10% based on the total weight of the rhodium particles contained in the second catalyst layer and the third catalyst layer.

5. The exhaust gas purification device according to claim 3, wherein the amount of the rhodium particles contained in the third catalyst layer is 20% or more based on the total weight of the rhodium particles contained in the second catalyst layer and the third catalyst layer.

* * * * *